United States Patent
Nania et al.

(10) Patent No.: US 9,148,063 B2
(45) Date of Patent: *Sep. 29, 2015

(54) RESET VOLTAGE CIRCUIT FOR A FORWARD POWER CONVERTER

(71) Applicant: Power Integrations, Inc., San Jose, CA (US)

(72) Inventors: Ionut A. Nania, San Jose, CA (US); Arthur B. Odell, Morgan Hill, CA (US)

(73) Assignee: Power Integrations, Inc., San Jose, CA (US)

( * ) Notice: Subject to any disclaimer, the term of this patent is extended or adjusted under 35 U.S.C. 154(b) by 271 days.

This patent is subject to a terminal disclaimer.

(21) Appl. No.: 13/890,738

(22) Filed: May 9, 2013

(65) Prior Publication Data

US 2013/0242619 A1    Sep. 19, 2013

Related U.S. Application Data

(63) Continuation of application No. 12/835,653, filed on Jul. 13, 2010, now Pat. No. 8,451,630.

(51) Int. Cl.
*H02M 3/335*      (2006.01)
*H02M 1/36*      (2007.01)

(52) U.S. Cl.
CPC ............ *H02M 3/33546* (2013.01); *H02M 1/36* (2013.01); *H02M 3/335* (2013.01)

(58) Field of Classification Search
CPC ...................................................... H02M 3/335
USPC ......................................... 363/21.04, 49, 127
See application file for complete search history.

(56) References Cited

U.S. PATENT DOCUMENTS

| | | | |
|---|---|---|---|
| 4,736,284 A | 4/1988 | Yamagishi et al. | |
| 4,754,385 A | 6/1988 | McDade et al. | |
| 4,870,553 A | 9/1989 | Brown | |
| 4,887,199 A | 12/1989 | Whittle | |
| 5,379,206 A | 1/1995 | Davidson | |
| 5,508,903 A | 4/1996 | Alexndrov | |
| 5,640,318 A | 6/1997 | Leu | |
| 5,883,793 A | 3/1999 | Farrington | |
| 6,639,814 B2 | 10/2003 | Gan et al. | |
| 6,947,299 B2 | 9/2005 | Odell | |
| 7,193,870 B2 | 3/2007 | Odell | |
| 7,433,208 B2 | 10/2008 | Nishida et al. | |
| 8,451,630 B2 * | 5/2013 | Nania et al. ................. | 363/21.04 |

OTHER PUBLICATIONS

PCT/US2011/043527—Search Report and Written Opinion of the International Searching Authority, mailed Feb. 9, 2012 (9 pages).

* cited by examiner

*Primary Examiner* — Jeffrey Sterrett
(74) *Attorney, Agent, or Firm* — Blakely Sokoloff Taylor & Zafman LLP

(57) ABSTRACT

An example method includes controlling a duty ratio of a switch to regulate an output of a forward power converter and storing a first voltage. The first voltage is equal to an input voltage of the forward power converter when the input voltage is at a steady-state value. The method also includes resetting a transformer of the forward power converter when the switch is in an OFF state by setting a voltage across a primary winding of the transformer to the stored first voltage in response to a drop in the input voltage to below the steady-state value. Further included in the method is increasing the duty cycle of the switch to greater than fifty (50) percent in response to the drop in the input voltage to maintain regulation at the output of the forward power converter.

24 Claims, 9 Drawing Sheets

RESET VOLTAGE CIRCUIT FOR A FORWARD POWER CONVERTER

TECHNICAL FIELD

This application is a continuation of U.S. application Ser. No. 12/835,653, filed Jul. 13, 2010, now pending. U.S. application Ser. No. 12/835,653 is hereby incorporated by reference.

BACKGROUND INFORMATION

Particular types of power supplies may convert the alternating current (ac) line delivered from a wall socket to the direct current (dc) power usable with many of today's electronics. A rectification circuit, such as a full rectifier and PFC circuit, may be used to convert the ac voltage to a dc output voltage. A dc-dc power converter included in the power supply may then be used to convert the dc output voltage from the rectifier circuit to a regulated dc voltage for use in electronic devices.

In one example the dc-dc power converter uses a power conversion topology known as a forward power converter. A forward power converter may use either one or two active switches to apply an input voltage to the primary winding of a transformer. In the forward converter, a secondary winding on the transformer produces a ratio of the voltage on the primary winding based on a turns ratio between the primary and secondary windings. The voltage on the secondary winding is then rectified and filtered to become an output voltage.

In the forward power converter, the output voltage is normally regulated by a control circuit. The control circuit compares the output voltage to a desired value. The control circuit turns the active switch(es) on and off, and adjusts a duty ratio to keep the output near the desired value. A duty ratio may be defined as the fraction of time that the switch is on in a single switching period. Each switching period may include a period when the switches are on, or in other words conducting current, subsequently followed by a period when the switches are off.

A reset circuit included in the forward power converter allows the magnetic flux of the transformer to reset (that is, to return to a much lower value) when the active switches are off. Resetting the magnetic flux of the transformer prevents excess stored energy from saturating the transformer (which alters properties of the transformer). The reset is generally achieved by applying a reset voltage of appropriate magnitude and duration to the primary winding when the active switches are off.

Typically, in a forward power converter, the duty ratio of the active switches are limited to 50% due to the design restrictions of the forward converter topology. Thus, when designing a forward power converter, considerations for the input voltage range of operation may be taken such that when operation is on the lower end of the input voltage range the duty ratio is close to 50%. Therefore, when the power supply receives an input voltage on higher end of the input voltage range, the duty ratio is substantially smaller (i.e., 20-30%). However, the design must also consider limiting the minimum duty ratio that the switches can operate at, to maintain accurate regulation and lower rms currents in the power switch(es).

A common technique used with the forward power converters is to extend the duty ratio beyond 50% to allow the forward power converter to operate over a wider range of input voltages and/or increase efficiency of the power converter by maximizing the duty ratio for nominal output power.

A common way to implement this technique, is to use a reset circuit to apply a voltage across the primary winding when the transformer is resetting that is artificially higher in value than the input voltage that appears on the primary winding when the switches are on. However, the power converter may incur increased power dissipation due to the reset circuit.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of an apparatus and method for a resetting a transformer of a forward power converter are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. In addition, it is appreciated that the figures provided herewith are for explanation purposes to persons ordinarily skilled in the art and that the drawings are not necessarily drawn to scale.

In short, embodiments of the present invention include a reset voltage circuit for a forward power converter that recycles energy from the transformer while also providing a reset voltage when the input voltage drops, such as during a ac fault condition. Setting the transformer with a reset voltage equal to a steady state value of the input voltage during an ac fault condition allows for the increase in maximum duty ratio to more than 50% to maintain output regulation for a period of time. In accordance with the teachings of the present invention, the forward power converter is able to operate over a wider range of input voltages, and increases efficiency. These and other embodiments are described in detail below.

Figure 1:
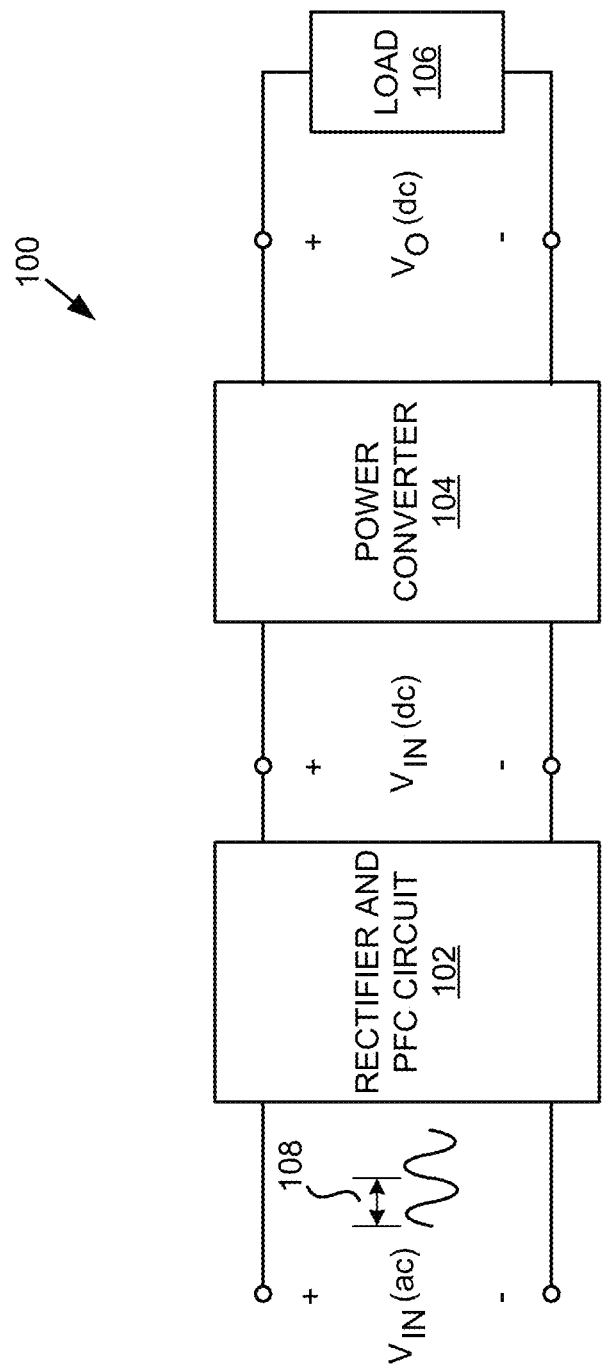
FIG. 1 is a functional block diagram illustrating a power system, in accordance with an embodiment of the invention.

FIG. 1 is a functional block diagram illustrating a power system 100 in accordance with an embodiment of the invention. The illustrated example of power system 100 includes a rectifier and PFC (Power Factor Correction) circuit 102 and a power converter 104. Rectifier and PFC circuit 102 is illustrated as being coupled to receive an ac input voltage signal $V_{IN}(ac)$.

As shown in FIG. 1, ac input voltage $V_{IN}(ac)$ is periodic, and switches between a positive polarity and a negative polarity over a line cycle 108. In one example, ac input voltage $V_{IN}(ac)$ has a frequency equal to 60 Hz such that period is about 16.7 ms. In one example, rectifier and PFC circuit 102 may be used to rectify ac input voltage $V_{IN}(c)$. In other words, rectifier and PFC circuit 102 may be used to convert ac input voltage $V_{IN}(ac)$ to a dc input voltage signal $V_{IN}(dc)$, which is defined as a voltage that maintains the same polarity. In one embodiment, power converter 104 is a forward power converter adapted to convert dc input voltage $V_{IN}(dc)$, from hereon referred to as "input voltage", to a regulated output voltage $V_O$. In one example, power converter 104 steps up input voltage $V_{IN}(dc)$ such that regulated output voltage $V_O$ is greater than an input voltage of power converter 104. In another example, power converter 104 steps down the input voltage $V_{IN}(dc)$ such that regulated output voltage $V_O$ is less than the input voltage $V_{IN}(dc)$ of power converter 104.

As further shown in FIG. 1, load 106 is coupled to receive regulated output voltage $V_O$. In one example, load 106 is a computer, such as a personal computer. In operation, power supply 100 may experience an ac fault condition, which may be caused by a temporary drop in the ac input voltage signal $V_{IN}(ac)$ for at least one or more line cycles 108. In response to a ac fault condition, the input voltage $V_{IN}(dc)$ received by power converter 104 may drop quickly.

Figure 2:
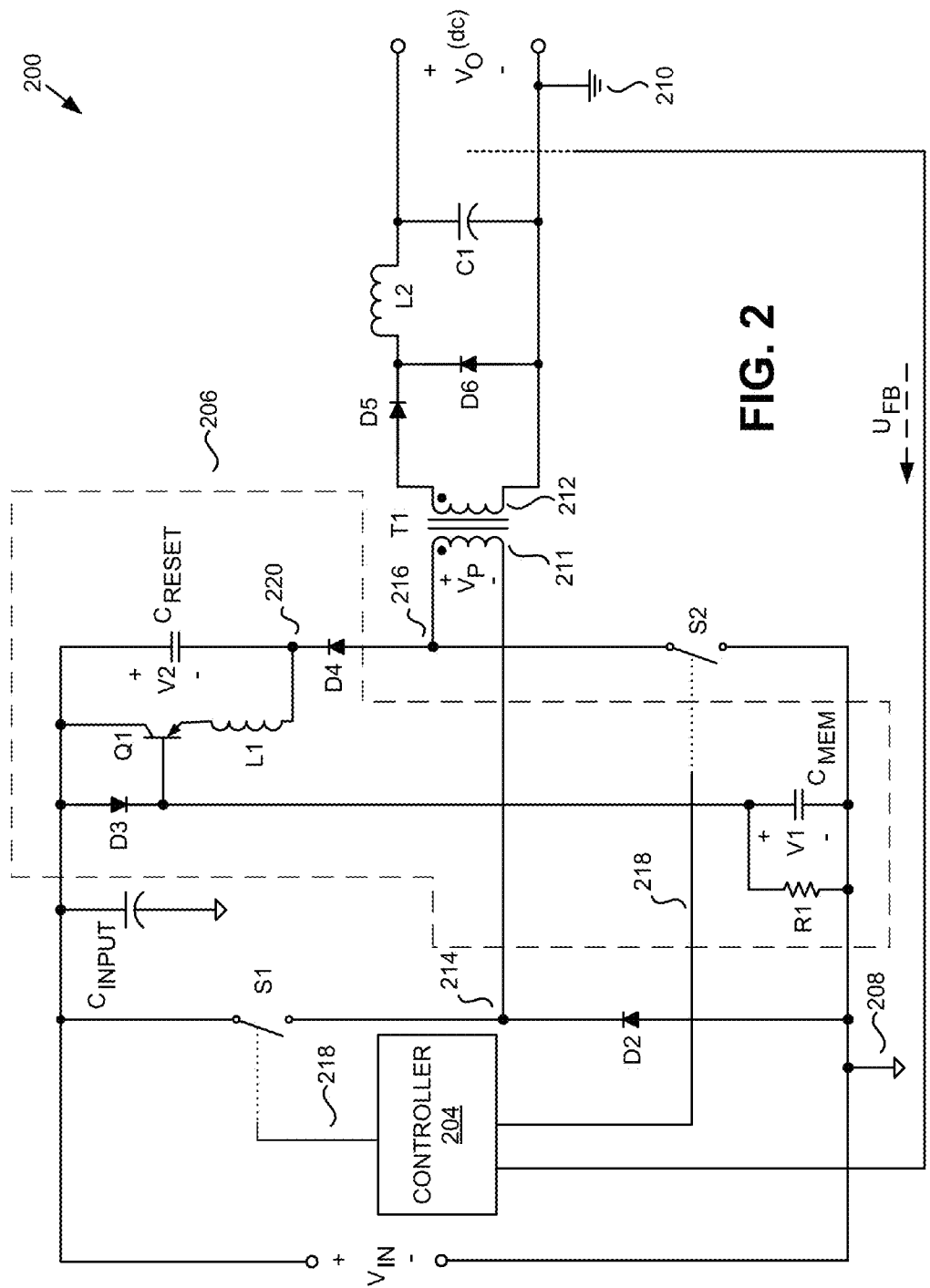
FIG. 2 is a schematic diagram illustrating a forward power converter utilizing a reset voltage circuit, in accordance with an embodiment of the invention.

FIG. 2 is a schematic diagram illustrating a forward power converter 200 utilizing a reset voltage circuit 206, in accordance with an embodiment of the invention. The illustrated example of forward power converter 200 includes active switches, S1 and S2, an input bulk capacitor $C_{INPUT}$, a controller 204, reset voltage circuit 206, diode D2, an input return 208, a transformer T1, an output diode D5, a freewheeling diode D6, an output inductor L2, an output capacitor C1, and an output return 210. The illustrated example of reset voltage circuit 206 includes a reset capacitor $C_{RESET}$, a memory capacitor $C_{MEM}$, a resistor R1, diodes D3 and D4, a clamp transistor Q1, and an inductor L1. The illustrated example of transformer T1 includes a primary winding 211 and a secondary winding 212. Forward power converter 200 is one possible implementation of power converter 104 of FIG. 1, where input voltage signal $V_{IN}$ is the dc input voltage signal $V_{IN}(dc)$ of FIG. 1. Although FIG. 2 illustrates forward power converter 200 as a two-switch forward power converter, embodiments of the present invention may also include a single switch forward power converter, using an auxiliary reset winding (not shown).

As shown in FIG. 2, diodes D2 and D4 are arranged in a configuration that produces a voltage $V_P$ on primary winding 211 of transformer T1 from an input voltage $V_{IN}$ In the example of FIG. 2, input voltage $V_{IN}$ has a negative terminal that is common with input return 208. Active switch S1 is shown as coupled to a high side of primary winding 211 at a node 214. Active switch S2 is shown as coupled to a low side of primary winding 211 at node 216. Active switch S2 may be referred to as a low-side switch because it has one terminal common with the input return 208.

In operation, secondary winding 212 of the transformer T1 produces a voltage $V_S$ proportional to the primary voltage $V_P$. Output diode D5 rectifies the voltage at secondary winding 212. Freewheeling diode D6, output inductor L2, and output capacitor C1 filter the rectified voltage from secondary winding 212 to produce an output voltage $V_O$. In the example of FIG. 2, the negative terminal of output voltage $V_O$ is common with an output return 210. As shown, secondary winding 212 of transformer T1 provides galvanic isolation from primary winding 211. That is, a dc current is unable to flow from the primary winding 211 to secondary winding 212.

An active switch receives a control signal that opens and closes the switch. An open switch, also referred to as being in an OFF state, is not able to substantially conduct current. A closed switch, also referred to as being in an ON state, is able to conduct current. In the example of FIG. 2, controller 204 is coupled to provide a switch signal 218 that opens and closes active switches S1 and S2. As shown, switches S1 and S2 are, metal oxide semiconductor field effect transistors (MOSFETs). In other examples, switches S1 and S2 may be, but not limited to bipolar junction transistors (BJTs), or insulated gate bipolar transistors (IGBTs). In one embodiment, controller 204 may be implemented as a monolithic integrated circuit or may be implemented with discrete electrical components or a combination of discrete and integrated components. Controller 204 and switches S1 and S2 could form part of an integrated circuit that is manufactured as either a hybrid or a monolithic integrated circuit.

In the example of FIG. 2, controller 204 receives a feedback signal $U_{FB}$. Feedback signal $U_{FB}$ is representative of an output of forward power converter 210. For example, feedback signal $U_{FB}$ may be representative of output voltage $V_O$, an output current (not shown) or a combination of both. In response to feedback signal $U_{FB}$, controller 204 generates switch signal 218 to control active switches S1 and S2 to regulate the output (e.g., output voltage $V_O$) of forward power converter 200. In the illustrated example, switches S1 and S2 are both switched to the ON state at the same time. Similarly, switches S1 and S2 are coupled to be switched to the OFF state at the same time. Switch signal 218 has a switching frequency and duty ratio that is controlled by controller 204. Typically, the switching frequency of switch signal 218 is much greater than the frequency of ac input voltage signal $V_{IN}(ac)$ (see FIG. 1). For example, ac input voltage signal $V_{IN}(ac)$ may have a frequency of 60 Hz, while switch signal 218 may have a switching frequency greater than 1 kHz.

Galvanic isolation is typically maintained between an input side referenced to input return 208 and the output side referenced to output return 210 in the transmission of the feedback signal $U_{FB}$ to controller 204 by ordinary methods known to those skilled in the art, such as for example the use of an optical coupler (not shown) or for example the use of a signal transformer (not shown).

In the illustrated example of forward power converter 200, a magnetic flux increases in the transformer T1 when the active switches S1 and S2 are turned on, also referred to herein as a power mode. The magnetic flux decreases in the transformer T1 when the active switches S1 and S2 are turned off, also referred to herein as a reset mode. The magnetic flux is associated with a magnetizing current that enters the windings of the transformer when active switches S1 and S2 are on. When active switches S1 and S2 turn off, the leakage current leaves the primary of the transformer T1 through the diode D4 and through reset voltage circuit 206 to be recycled in input bulk capacitor $C_{INPUT}$. In one example, diode D4 is a slow recovery diode to allow energy stored in capacitor $C_{RESET}$ to flow back through diode D4 once current in primary winding 211 has dropped to zero.

Figure 3A:
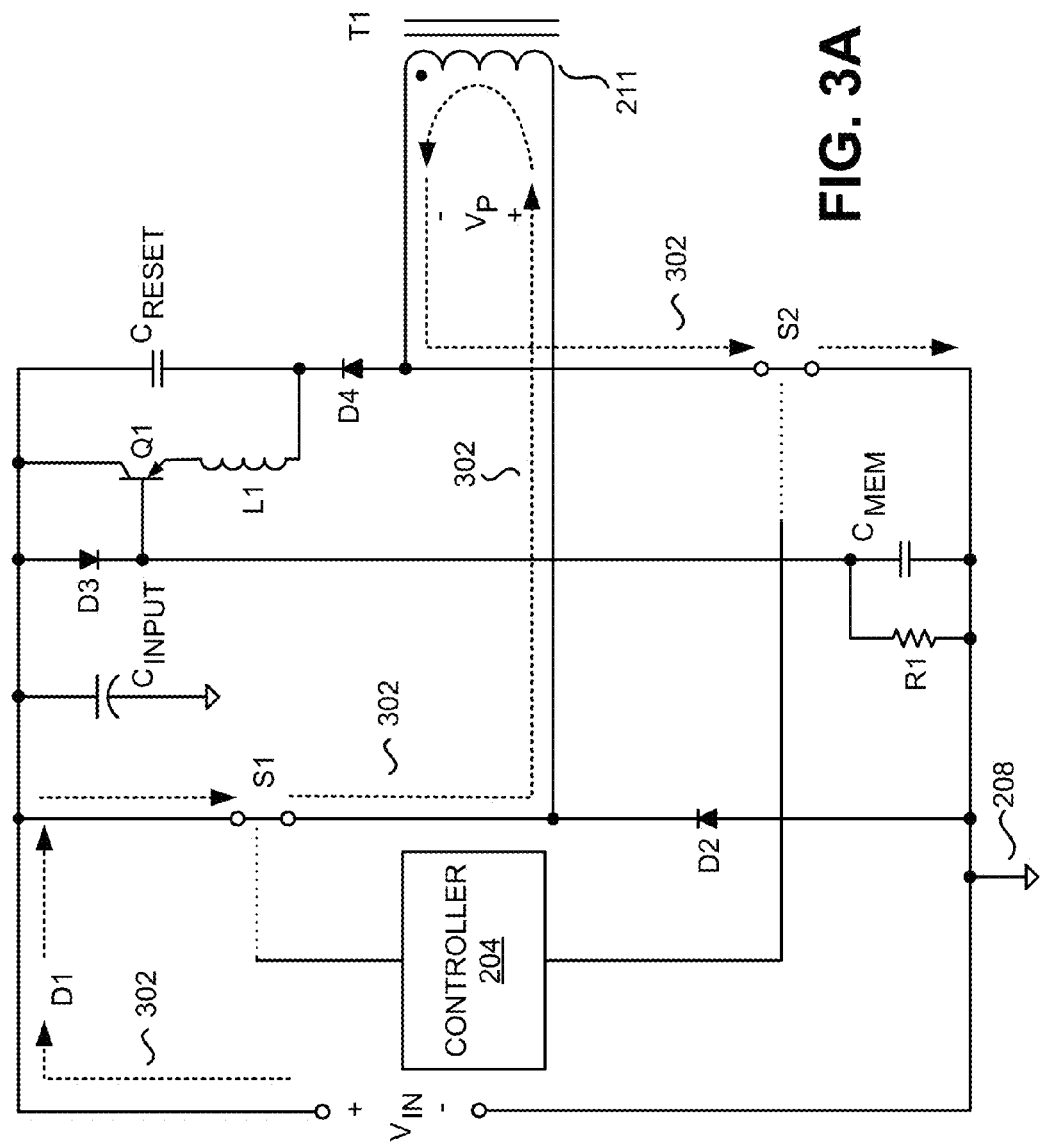
FIG. 3A is a schematic diagram illustrating current flow of the forward power converter of FIG. 2 during a power transfer mode.

FIG. 3A is a schematic diagram illustrating current flow 302 of the forward power converter of FIG. 2 during the power mode (i.e., when active switches S1 and S2 are in the ON state). As shown in FIG. 3A, current 302 is received from the input voltage signal $V_{IN}$, through active switch S1, and on through primary winding 211. Current 302 is then illustrated as flowing through primary winding 211 to generate voltage $V_P$. Current 302 then flows out of primary winding 211, through active switch S2 and back to input return 208.

Figure 3B:
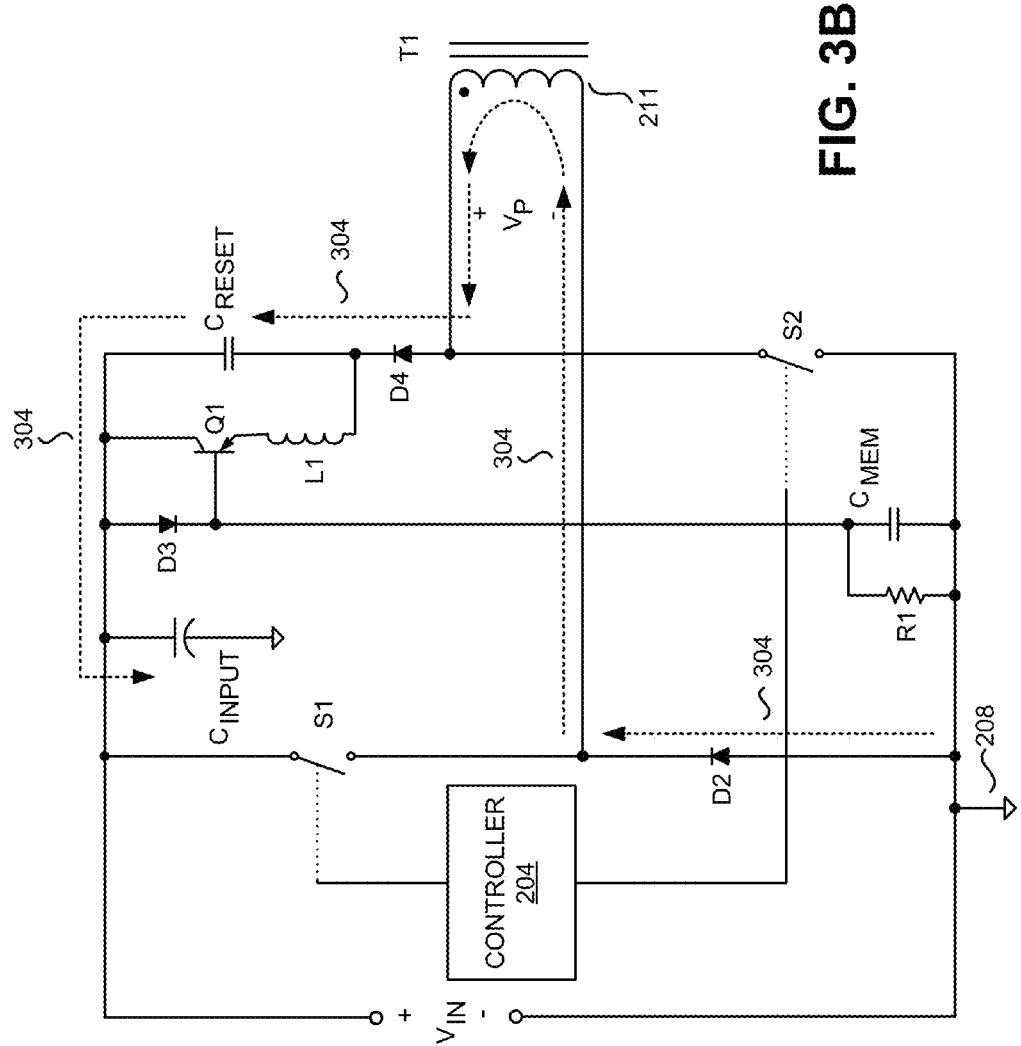
FIG. 3B is a schematic diagram illustrating current flow of the forward power converter of FIG. 2 during a reset mode.

FIG. 3B is a schematic diagram illustrating current flow 304 of the forward power converter of FIG. 2 during a reset mode (i.e., when active switches S1 and S2 are in the OFF state). As discussed above, when active switches S1 and S2 are on, a magnetizing current that enters primary winding 211 results in the increase of magnetic flux. Due to the action of abruptly attempting to change magnetic flux in transformer T1, when active switches S1 and S2 are turned off, a polarity of the voltage across primary winding 211 changes and current 304 flows through diode D2, through primary winding 211, through diode D4, and through reset capacitor $C_{RESET}$ to be recycled in input bulk capacitor $C_{INPUT}$. In one example, current 304 may include magnetization current and/or leakage current. Thus, reset capacitor $C_{RESET}$ of reset voltage circuit 206 provides a pathway for recycling of leakage energy in the transformer, where the leakage energy is recycled into the input bulk capacitor $C_{INPUT}$. In one example, the recycling of energy refers to the reuse of magnetization current and/or leakage current in subsequent switching cycles of power converter 200. That is, energy transferred to input bulk capacitor from primary winding 211 during a reset of transformer T1, may be subsequently used in a next power mode (i.e., when active switches S1 and S2 are next turned on) and transferred to the output of power converter 200.

As shown in FIG. 2, reset voltage circuit 206 further includes a memory capacitor $C_{MEM}$. In general, memory capacitor $C_{MEM}$ is utilized to provide a constant reset voltage to the primary winding 211 even when the input voltage signal $V_{IN}$ may be experiencing a drop below a steady-state value due to, for example an ac fault condition. In operation memory capacitor $C_{MEM}$ is illustrated as having a terminal coupled to input return 208 and another terminal coupled to diode D3. As shown, diode D3 is coupled between the positive input voltage rail and memory capacitor $C_{MEM}$, such that memory capacitor $C_{MEM}$ is charged to a voltage (i.e., voltage V1) that is substantially equal to the input voltage signal $V_{IN}$. Diode D3 further allows the voltage V1 to be maintained across memory capacitor $C_{MEM}$ when the input voltage signal $V_{IN}$ drops.

As is further shown in FIG. 2, reset voltage circuit 206 further includes a resistor R1. Resistor R1 is coupled across memory capacitor $C_{MEM}$ to gradually discharge the memory capacitor $C_{MEM}$. In one example, resistor R1 may also be coupled to gradually discharge the memory capacitor $C_{MEM}$ to allow forward power converter 200 to operate with different input voltages. For example, assuming a steady-state value of the input voltage signal $V_{IN}$ is initially 300 V dc, then memory capacitor $C_{MEM}$ will charge to a value equal to 300 V dc. Continuing with this example, if the steady state input voltage signal $V_{IN}$ were to drop to 200 V dc, memory capacitor $C_{MEM}$ would initially maintain voltage V1 at 300 V dc for a period of time, but due to resistor R1, would eventually discharge to a value equal to the new steady-state value of 200 V dc.

Still referring to FIG. 2, memory capacitor $C_{MEM}$ is coupled such that, during a reset mode, the voltage at node 220 (i.e., the reset voltage) with respect to input return 208 is substantially equal to the voltage V1 stored in the memory capacitor $C_{MEM}$. Since the reset voltage at node 220 is substantially equal to voltage V1 during the reset mode, the voltage across reset capacitor $C_{RESET}$ is substantially zero when the input voltage signal $V_{IN}$ is at a steady-state value. That is, memory capacitor $C_{MEM}$ stores the steady-state value of the input voltage signal $V_{IN}$, which is then provided at node 220. If the input voltage signal $V_{IN}$ continues at its steady-state value then both sides of reset capacitor $C_{RESET}$ are at a value equal to the steady-state value of input voltage signal $V_{IN}$, resulting in a voltage V2 across reset capacitor $C_{RESET}$ of zero. Stated another way, reset capacitor $C_{RESET}$ is coupled such that the voltage V2 across the reset capacitor $C_{RESET}$, during the reset mode, is substantially equal to the stored voltage V1 minus the input voltage $V_{IN}$, as shown below:

$$V2_{(resetmode)} \approx V1 - V_{IN} \tag{EQ. 1}$$

In the case of a drop in the input voltage signal $V_{IN}$ to below the steady-state value, due, for example, to an ac fault condition, the memory capacitor $C_{MEM}$ provides the stored voltage V1 (equal to the steady-state value of the input voltage signal $V_{IN}$ before the drop in value) to node 220. Since the voltage V2 across the reset capacitor $C_{RESET}$, during the reset mode, is substantially equal to the stored voltage V1 minus the input voltage, the voltage V2 across reset capacitor $C_{RESET}$ increases to greater than zero. Furthermore, a zero voltage across reset capacitor $C_{RESET}$, means that diode D4 is coupled directly to the input voltage rail of power converter 200.

Clamp transistor Q1 is illustrated as coupled to reset capacitor $C_{RESET}$ to limit the maximum value of voltage V2 across reset capacitor $C_{RESET}$. In one example, clamp transistor limits voltage V2 across reset capacitor $C_{RESET}$ to no more than $V_{IN}-V_1$. In operation, during resetting of transformer T1, Q1 will adjust the voltage at node 220 to maintain voltage V2 across reset capacitor $C_{RESET}$ to substantially zero volts. That is, any slight increase in voltage V2 due to currents from D4 during reset mode will be automatically adjusted by clamp transistor Q1.

Further included in the illustrated example of reset voltage circuit is inductor L1. In one example, inductor L1 is provided to limit an instant current though clamp transistor Q1, regardless of any dynamic voltage variation of reset capacitor $C_{RESET}$. In one example, clamp transistor Q1 is a low power, high voltage, bipolar transistor. In one application, a power dissipation of Q1 when input voltage $V_{IN}$ is at a steady-state value is around 6 mW at 24 mA emitter current, with short power peaks up to 130 mW at 1.4 mA emitter current during an ac fault condition. Continuing with this example, clamp transistor Q1 may have a power rating of double the anticipated power dissipation, or in other words, up to 250 mW peak power dissipation.

Figure 4A:
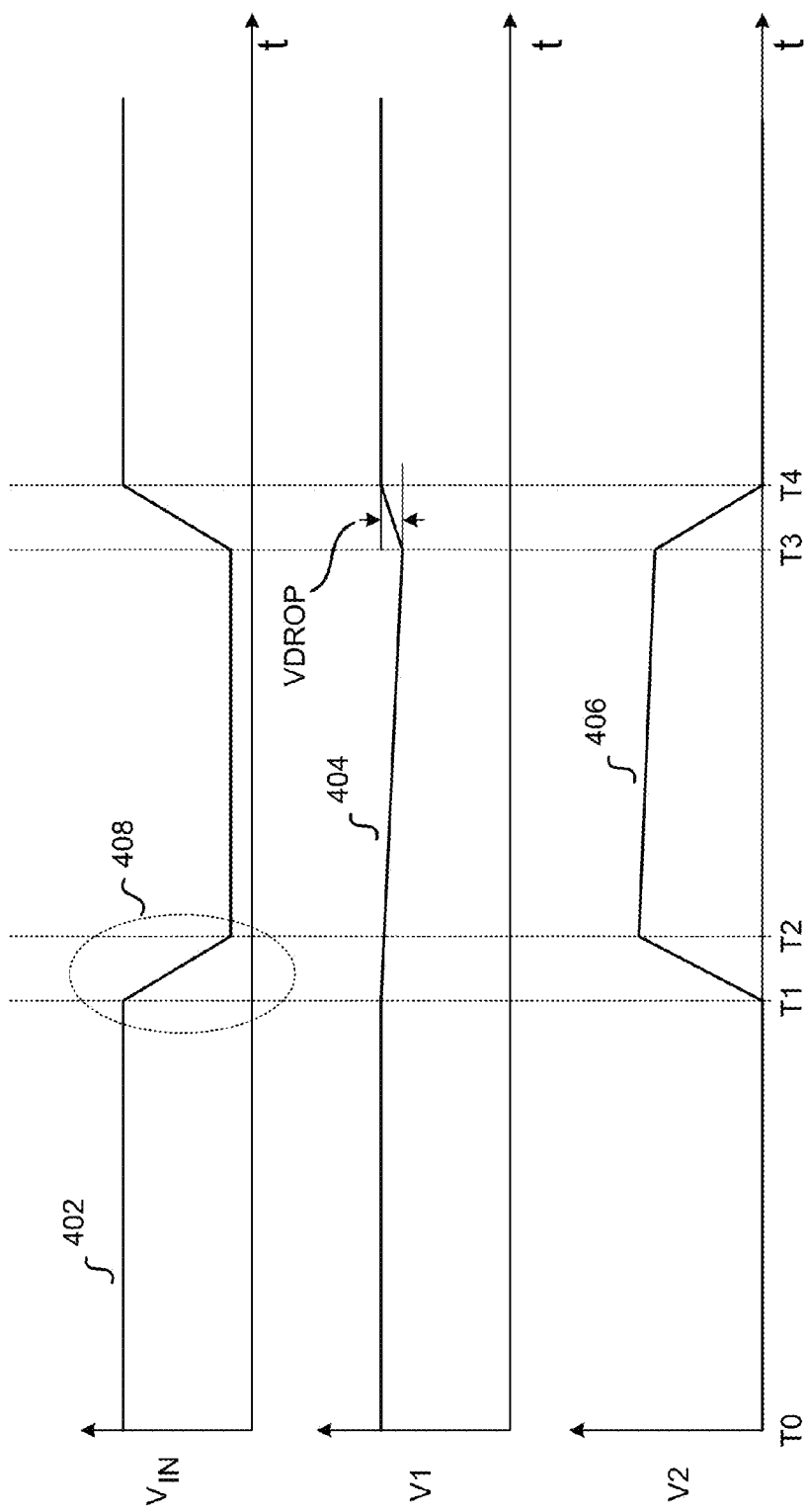
FIG. 4A is a timing diagram illustrating the input voltage having a steady state value and a drop in value below the steady state value, in accordance with an embodiment of the invention.

FIG. 4A is a timing diagram illustrating the input voltage $V_{IN}$ having a steady state value and a drop in value to below the steady state value, in accordance with an embodiment of the invention. At a time T0 the input voltage signal is at a steady-state value 402. That is, a magnitude of the input voltage signal $V_{IN}$ is substantially constant or unchanging with respect to time. At a time T1, the input voltage signal $V_{IN}$ begins to drop to a value below the steady-state value, due, for example, to a brown out condition. As is shown in FIG. 4A, the voltage V2 across reset capacitor is substantially zero from time T0 until time T1 when the input voltage signal $V_{IN}$ begins to drop. Because of EQ. 1, given above, voltage V2 closely tracks changes in input voltage signal $V_{IN}$. That is, the voltage V2 increases in response to decreases in the input voltage signal $V_{IN}$, because V1 is held substantially constant by memory capacitor $C_{MEM}$.

Also shown in FIG. 4A is a non-zero slope 404 of stored voltage V1. The slope 404 of stored voltage V1 is due, in part, to the discharging of memory capacitor $C_{MEM}$ by resistor R1 and to a capacitance value of capacitance memory $C_{MEM}$. In one example, the amount of voltage drop $V_{DROP}$ that stored voltage V1 drops during an ac fault condition (e.g., time t1 to time t3) is negligible. In another example, the maximum amount of time that $C_{MEM}$ is able to provide the stored voltage V1 during an ac fault condition is responsive to the capacitance value of the memory capacitor $C_{MEM}$. In one example, memory capacitor $C_{MEM}$ has a capacitance value of 1 μf such that memory capacitor $C_{MEM}$ can provide the stored voltage V1 for at least 16 ms during the drop in input voltage $V_{IN}$. As further shown in FIG. 4A, voltage V2 across the reset capacitor $C_{RESET}$, also includes a slope, mainly due to the slope 404 of stored voltage V1 (e.g., see EQ. 1 above).

Figure 4B:
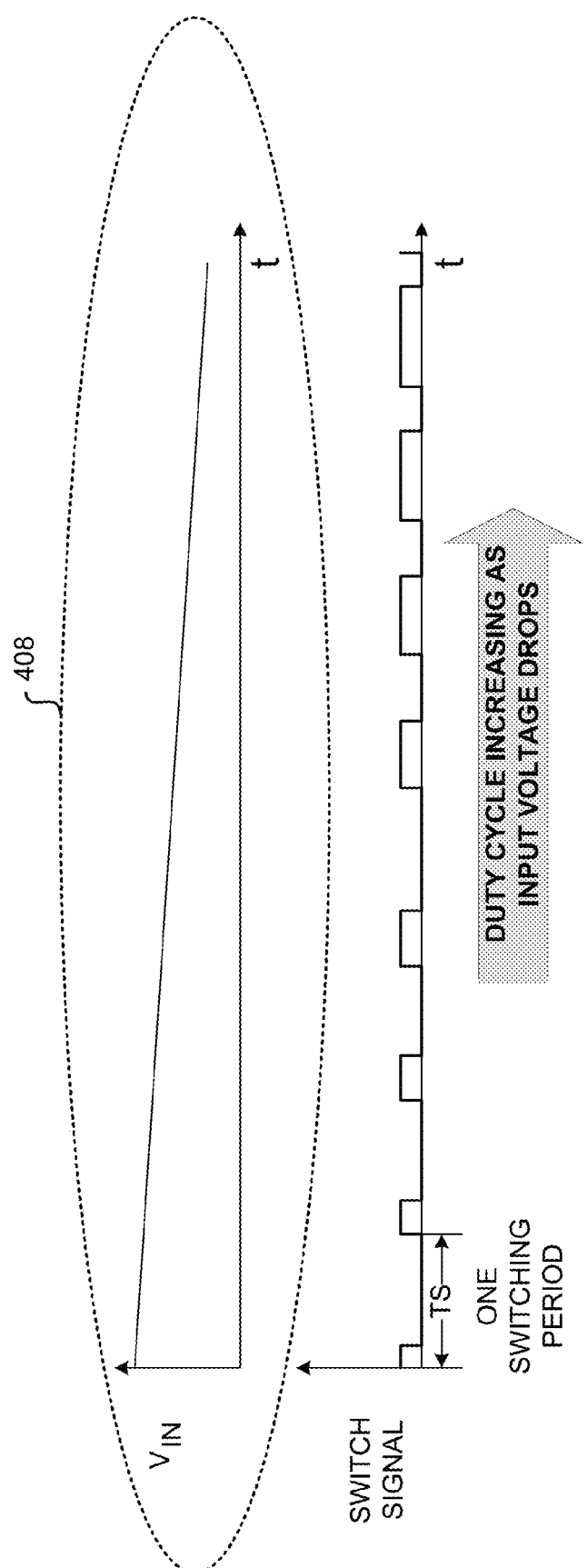
FIG. 4B is a timing diagram illustrating an expanded view of the drop in input voltage of FIG. 4A.

FIG. 4B is a timing diagram illustrating an expanded view of portion 408 of FIG. 4A showing the drop in input voltage $V_{IN}$ and its relationship to switching signal 218 (FIG. 2). As shown in FIG. 4B, controller 204 increases the duty ratio of switching signal 218 in response to a drop in the input voltage. In one example, the controller 204 may increase the duty ratio to greater than 50% and still maintain a volt-second balance of the forward power converter 200 because of the constant reset voltage provided by memory capacitor $C_{MEM}$. A volt-second balance of a power converter requires that the integral of the voltage across the primary winding over the entire switching period must be substantially zero for stable operation. The integral has units of volts-second, hence the name volt-second balance. If the integral of the voltage across the primary winding does not equal to zero, then an amplitude of the current through the primary winding 211 would continuously increase. Another way to express the volt-second balance is as follows:

$$(V_{PON}) \cdot (T_{ON}) = (V_{POFF}) \cdot (T_{OFF}) \quad (EQ. 2),$$

where $V_{PON}$ is the voltage across primary winding 211 when switches S1 and S2 are in the ON state, $T_{ON}$ is the time that switches S1 and S2 are in the ON state, $V_{POFF}$ is the voltage across primary winding 211 when switches S1 and S2 are in the OFF state, and $T_{OFF}$ is the time that switches S1 and S2 are in the OFF state. For power converter 200, the voltage $V_{PON}$ across primary winding 211 when switches S1 and S2 are in the ON state is equal to the input voltage $V_{IN}$. Thus reset voltage circuit 206 allows for the increase of the ON time $T_{ON}$ to increase duty ratio (e.g., to greater than 50%), as the input voltage $V_{IN}$ drops.

Figure 4C:
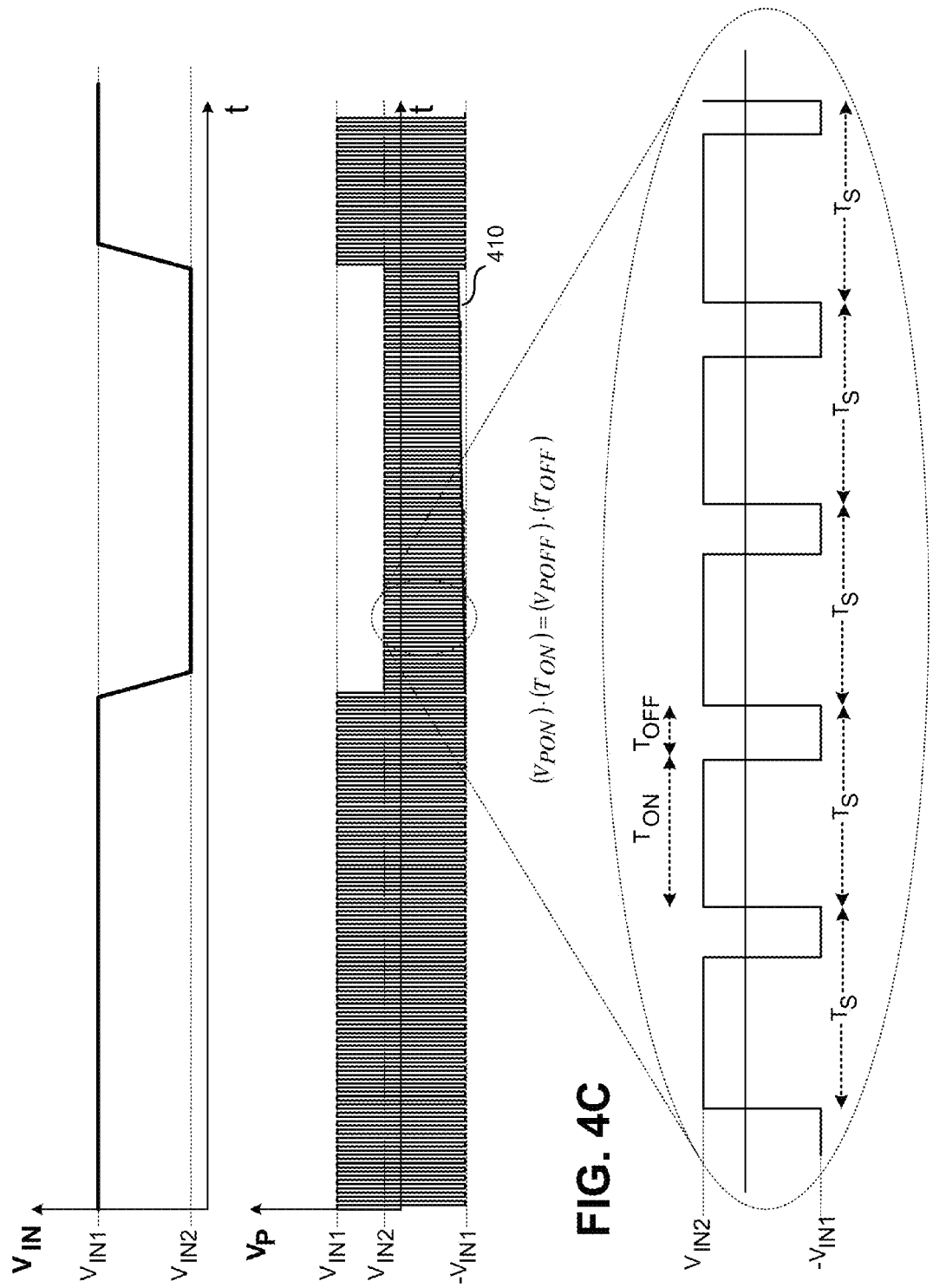
FIG. 4C is a timing diagram illustrating the voltage across a primary winding of a transformer, in accordance with an embodiment of the invention.

FIG. 4C is a timing diagram illustrating the voltage $V_P$ across primary winding 211 of transformer T1, in accordance with an embodiment of the invention. As shown in FIG. 4C, the voltage $V_P$ across primary winding 211 is substantially equal to the input voltage signal $V_{IN}$ during all on times $T_{ON}$. For example, when input voltage signal $V_{IN}$ is at a steady state value of $V_{IN1}$, voltage $V_P$ is equal to $V_{IN1}$ during the on time $T_{ON}$. Similarly, when input voltage signal $V_{IN}$ drops to a value $V_{IN2}$, voltage $V_P$ also drops to a value equal to $V_{IN2}$ during the on time $T_{ON}$. Thus, the voltage $V_P$ across the primary winding 211 during the on time $T_{ON}$ follows the input voltage signal $V_{IN}$. However, in accordance with embodiments of the present invention, the voltage $V_P$ during the off times (i.e., $T_{OFF}$) remains substantially constant, regardless of whether the input voltage signal $V_{IN}$ drops below the steady-state value. For example, as shown in FIG. 4C, voltage $V_P$ is equal to $-V_{IN1}$ when $V_{IN}$ is at the steady-state value $V_{IN1}$. During a drop in input voltage, such as during an ac fault condition, $V_P$ during the off time $T_{OFF}$ is also substantially equal to $-V_{IN1}$. In one embodiment, the value of $V_P$ during a drop in input voltage and during the off time $T_{OFF}$ gradually decreases due to a discharging of memory capacitor $C_{MEM}$, as shown by slope 410.

Figure 5:
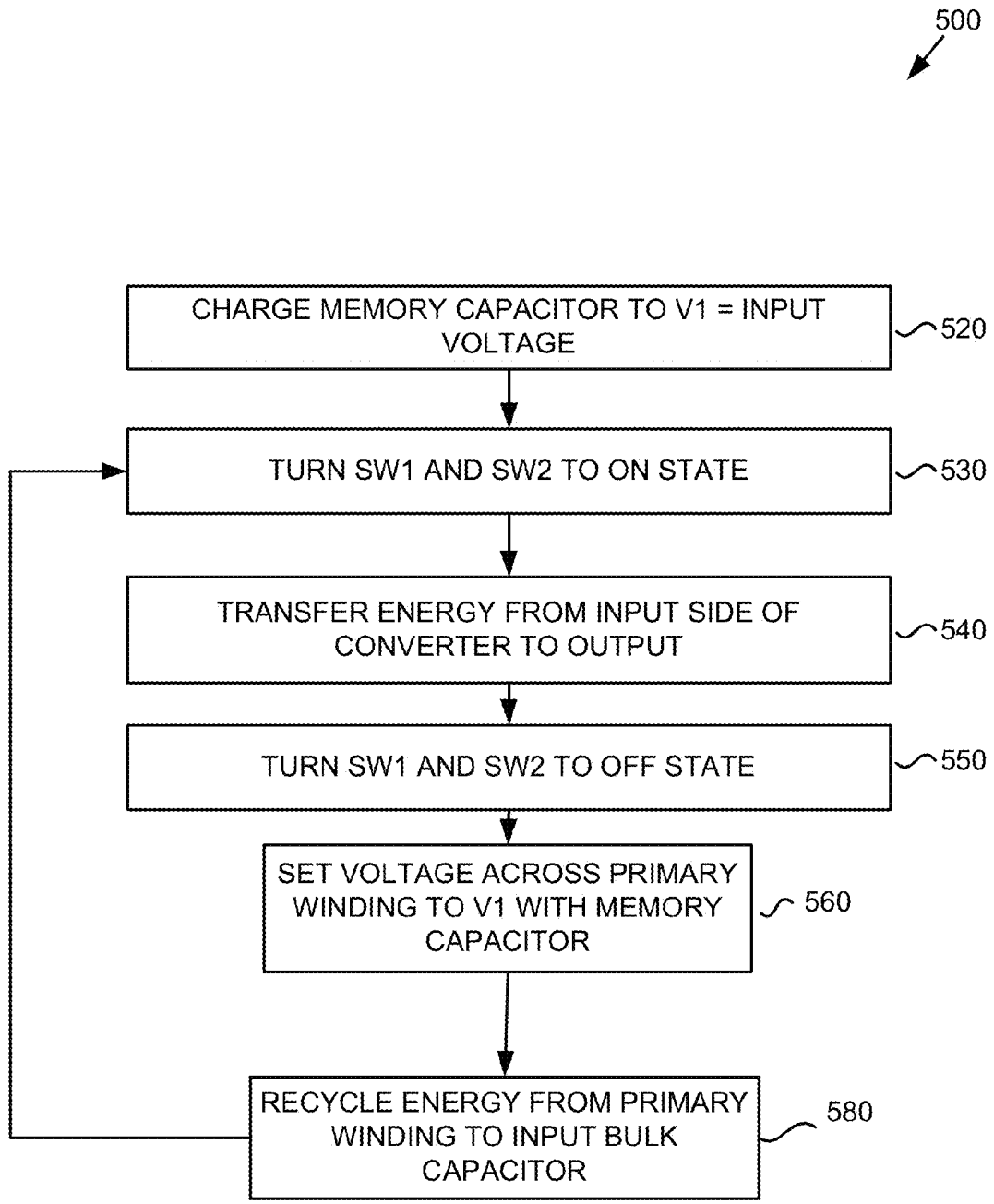
FIG. 5 flow chart illustrating a process of resetting a transformer, in accordance with an embodiment of the invention.

FIG. 5 flow chart illustrating a process 500 of resetting a transformer, in accordance with an embodiment of the invention. The order in which some or all of the process blocks appear in process 500 should not be deemed limiting. Rather, one of ordinary skill in the art having the benefit of the present disclosure will understand that some of the process blocks may be executed in a variety of orders not illustrated. In a process block 520, assuming a steady-state value of input voltage signal $V_{IN}$, memory capacitor $C_{MEM}$ is charged to voltage V1 which is equal to the steady-state value of input voltage signal $V_{IN}$. In a process block 530 controller 204 turns active switches SW1 and SW2 to the ON state such that energy is transferred from the input side to the output side of power converter 200 in process block 540. In a process block 550, controller 204 turns both active switches SW1 and SW2 to the OFF state, thereby initiating a reset mode. As shown in FIG. 5, decision block 560 sets the voltage $V_P$ across the primary winding 211 to the stored voltage V1 across memory capacitor $C_{MEM}$. In operation, voltage V1 will be representative of the steady state value of the input voltage during an ac fault condition. Next, in a process block 580, energy from primary winding 211 is recycled to the input bulk capacitor $C_{INPUT}$.

Figure 6:
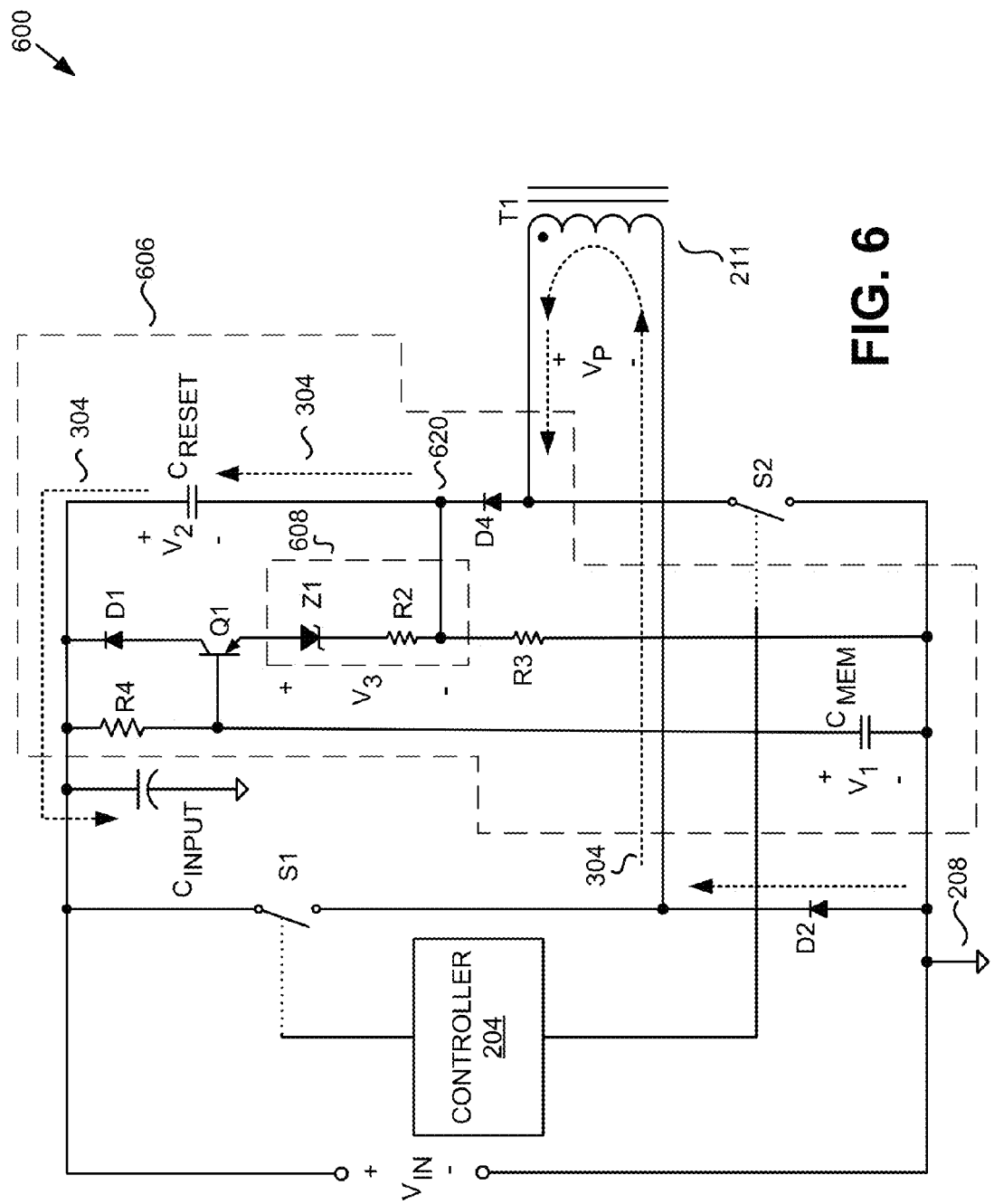
FIG. 6 is a schematic diagram illustrating a forward power converter utilizing a reset voltage circuit, in accordance with an embodiment of the invention.

FIG. 6 is a schematic diagram illustrating a forward power converter 600 utilizing a reset voltage circuit 606, in accordance with an embodiment of the invention. The illustrated example of forward power converter 600 includes active switches, S1 and S2, input bulk capacitor $C_{INPUT}$, controller 204, reset voltage circuit 606, diode D2, input return 208, and transformer T1. Although not shown in FIG. 6, power converter 600 may also include output diode D5, freewheeling diode D6, output inductor L2, output capacitor C1, and output return 210, on the secondary side as illustrated in FIG. 2. Referring back to FIG. 6, the illustrated example of reset voltage circuit 606 includes reset capacitor $C_{RESET}$, memory capacitor $C_{MEM}$, resistors R3 and R4, diodes D1 and D4, clamp transistor Q1, and a shunt regulator circuit 608. The illustrated example of shunt regulator circuit 608 includes a Zener diode Z1 and a resistor R2. Forward power converter 600 is one possible implementation of power converter 104 of FIG. 1, where input voltage signal $V_{IN}$ is the dc input voltage signal $V_{IN}$(dc) of FIG. 1. Although FIG. 6 illustrates forward power converter 600 as a two-switch forward power converter, embodiments of the present invention may also include a single switch forward power converter, using an auxiliary reset winding (not shown).

Similar to the embodiment of forward power converter 200, shown in FIG. 2, diodes D2 and D4 are arranged in a configuration that produces a voltage $V_P$ on primary winding 211 of transformer T1 from an input voltage $V_{IN}$. In the illustrated example of forward power converter 600, a magnetic flux increases in the transformer T1 when the active switches S1 and S2 are turned on. The magnetic flux decreases in the transformer T1 when the active switches S1 and S2 are turned off. The magnetic flux is associated with a magnetizing current that enters the windings of the transformer when active switches S1 and S2 are on. When active switches S1 and S2 turn off, the leakage and magnetizing current leaves the primary of the transformer T1 through diode D4 and through reset voltage circuit 606 so a portion of the energy may be recycled back to input bulk capacitor $C_{INPUT}$. FIG. 6 also illustrates a current flow 304 of the forward power converter 600 during the reset mode (i.e., when active switches S1 and S2 are in the OFF state). As discussed above, when active switches S1 and S2 are on, a magnetizing current that enters primary winding 211 results in the increase of magnetic flux. When active switches S1 and S2 are turned off, a polarity of the voltage across primary winding 211 changes and current 304 flows through diode D2, through primary winding 211, through diode D4, and through reset capacitor $C_{RESET}$ to be recycled in input bulk capacitor $C_{INPUT}$. In one example, current 304 may include magnetization current and/or leakage current. Thus, reset capacitor $C_{RESET}$ of reset voltage circuit 606 provides a pathway for recycling of magnetizing and leakage current in the transformer, where the energy is recycled into the input bulk capacitor $C_{INPUT}$. In one example, the recycling of energy refers to the reuse of magnetization current and/or leakage current in subsequent switching cycles of power converter 600. That is, energy transferred to input bulk capacitor from primary winding 211 during a reset of transformer T1, may be subsequently used in a next power mode (i.e., when active switches S1 and S2 are next turned on) and transferred to the output (not shown) of power converter 600.

As shown in FIG. 6, reset voltage circuit 606 further includes memory capacitor $C_{MEM}$. In general, memory capacitor $C_{MEM}$ is utilized to provide a reset voltage to the primary winding 211 even when the input voltage signal $V_{IN}$ may be experiencing a drop below a steady-state value due to, for example an ac fault condition. In operation memory capacitor $C_{MEM}$ is illustrated as having a terminal coupled to input return 208 and another terminal coupled to resistor R4. Resistor R4 is coupled between the positive input voltage rail and memory capacitor $C_{MEM}$, such that memory capacitor $C_{MEM}$ is charged to a voltage (i.e., voltage V1) that is substantially equal to the input voltage signal $V_{IN}$.

Still referring to FIG. 6, memory capacitor $C_{MEM}$ is coupled such that, during a reset mode, the voltage at node 620 (i.e., the reset voltage) with respect to input return 208 is greater than the voltage V1 stored in the memory capacitor $C_{MEM}$. In the illustrated example, the voltage at node 620, during the reset mode, is substantially equal to voltage V1 plus voltage V3. Therefore, the voltage at node 620 (and therefore voltage $V_P$), during the reset mode, is substantially equal to the stored voltage V1 plus voltage V3 (i.e., V1+V3).

Clamp transistor Q1 is illustrated as coupled to diode D1 to limit the maximum value of voltage V2 across reset capacitor $C_{RESET}$. In one example, clamp transistor limits voltage V2 across reset capacitor $C_{RESET}$ to no more than V3. In operation, during resetting of transformer T1, Q1 will adjust the voltage at node 620 to maintain voltage V2 across reset capacitor $C_{RESET}$ to substantially V3. That is, any slight increase in voltage V2 due to currents from D4 during reset mode will be automatically adjusted by clamp transistor Q1. Also included in reset voltage circuit 606 is diode D1 coupled between the positive input voltage rail and clamp transistor Q1 to prevent a forward biasing of the collector to base junction of clamp transistor Q1, for example during a start up condition of the power converter 600.

Further included in the illustrated example of reset voltage circuit 606 is shunt regulator circuit 608 coupled to provide the voltage V3. In one example, shunt regulator circuit 608 includes Zener diode Z1 having a breakdown voltage. In one example, the breakdown voltage of Zener diode Z1 is 150 volts. Furthermore, resistor R2 may have a small resistance value relative to that of resistor R3 such that voltage V3 across shunt regulator circuit 608 is substantially equal to the breakdown voltage of Zener diode Z1. In this manner, primary winding 211 is exposed to an artificially higher reset voltage than input voltage $V_{IN}$. This allows for increased duty ratio at nominal output, which reduces the rms (root mean square) current through switches S1 and S2 allowing for better efficiency.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method, comprising:
controlling a duty ratio of a switch to regulate an output of a forward power converter;
storing a first voltage, wherein the first voltage is equal to an input voltage of the forward power converter when the input voltage is at a steady-state value;
resetting a transformer of the forward power converter when the switch is in an OFF state by setting a voltage across a primary winding of the transformer to the stored first voltage in response to a drop in the input voltage to below the steady-state value; and
increasing the duty cycle of the switch to greater than fifty (50) percent in response to the drop in the input voltage to maintain regulation at the output of the forward power converter.

2. The method of claim 1, further comprising recycling energy from the primary winding of the transformer to an input bulk capacitor of the forward power converter when the switch is in the OFF state.

3. The method of claim 2, wherein recycling energy from the primary winding of the transformer includes providing a pathway for leakage energy from the primary winding to the input bulk capacitor and reusing the leakage energy in a subsequent switching cycle of the switch.

4. The method of claim 3, wherein providing a pathway includes coupling a reset capacitor between the primary winding and the input bulk capacitor.

5. The method of claim 4, further comprising maintaining a voltage across the reset capacitor to a value substantially equal to the first voltage minus the input voltage.

6. The method of claim 4, wherein a voltage across the reset capacitor is substantially zero when the input voltage is at the steady-state value.

7. The method of claim 4, wherein a voltage across the reset capacitor increases in response to the input voltage dropping below the steady-state value.

8. The method of claim 1, wherein the steady-state value is a non-zero steady-state value.

9. The method of claim 1, wherein storing the first voltage includes storing the first voltage in a memory capacitor.

10. The method of claim 9, wherein the steady-state value of the input voltage is a first steady-state value, the method further comprising discharging the memory capacitor with a resistance to allow the memory capacitor to store a second voltage equal to a second steady-state value of the input voltage when the input voltage drops to the second steady-state value.

11. The method of claim 9, wherein storing the first voltage includes maintaining the first voltage in the memory capacitor as the input voltage drops below the steady-state value.

12. The method of claim 9, wherein a maximum amount of time that regulation is maintained while the input voltage is below the steady-state value is responsive to a capacitance value of the memory capacitor.

13. The method of claim 12, wherein the capacitance value of the memory capacitor is at least 1 microfarad (µF) such that the memory capacitor provides the stored first voltage for at least 16 milliseconds (ms) when the input voltage is below the steady-state value.

14. A forward power converter, comprising:
 an input bulk capacitor to be coupled to receive an input voltage of the forward power converter;
 a transformer having a primary winding;
 a switch coupled to the primary winding to control a transfer of energy through the transformer;
 a controller coupled to control a duty cycle of the switch to regulate an output of the forward power converter;
 means for storing a first voltage, wherein the first voltage is equal to the input voltage of the forward power converter when the input voltage is at a steady-state value; and
 means for resetting the transformer when the switch is in an OFF state by setting a voltage across the primary winding to the stored first voltage in response to a drop in the input voltage to below the steady-state value, wherein the controller increases the duty cycle of the switch to greater than fifty (50) percent in response to the drop in the input voltage to maintain regulation at the output of the forward power converter.

15. The power converter of claim 14, further comprising means for recycling energy from the primary winding of the transformer to the input bulk capacitor when the switch is in the OFF state.

16. The power converter of claim 15, wherein the means for recycling energy from the primary winding of the transformer includes means for providing a pathway for leakage energy from the primary winding to the input bulk capacitor.

17. The power converter of claim 14, wherein the steady-state value is a non-zero steady-state value.

18. A reset voltage circuit for a forward power converter having a power mode and a reset mode, wherein a magnetic flux increases in a transformer of the forward power converter during the power mode and decreases during the reset mode, the reset voltage circuit comprising:
 a reset capacitor to be coupled between a primary winding of the transformer and an input bulk capacitor of the forward power converter to provide a pathway for recycling leakage energy from the primary winding of the transformer to the input bulk capacitor during the reset mode; and
 a memory capacitor to be coupled to store a first voltage equal to an input voltage of the power converter when the input voltage is at a steady-state value, and wherein the memory capacitor is further coupled to maintain the first voltage across the primary winding of transformer during the reset mode when the input voltage of the forward power converter drops below the steady-state value.

19. The reset voltage circuit of claim 18, wherein recycling the leakage energy to the input bulk capacitor includes using the leakage energy in a subsequent power mode of the forward power converter.

20. The reset voltage circuit of claim 18, wherein the reset capacitor is coupled such that a voltage across the reset capacitor is substantially equal to the first voltage minus the input voltage of the forward power converter.

21. The reset voltage circuit of claim 20, wherein the voltage across the reset capacitor is substantially zero volts when the input voltage is at the steady-state value.

22. The reset voltage circuit of claim 18, further comprising a clamp transistor coupled to the reset capacitor to limit a voltage across the reset capacitor when the input voltage of the forward power converter drops below the steady-state value.

23. The reset voltage circuit of claim 22, further comprising an inductor coupled between the clamp transistor and the primary winding to limit a current flowing through the clamp transistor.

24. The reset voltage circuit of claim 18, further comprising a resistor coupled to gradually discharge the memory capacitor to allow the forward power converter to operate with different input voltages.

* * * * *